United States Patent
Schreck

(10) Patent No.: US 9,981,300 B2
(45) Date of Patent: May 29, 2018

(54) FLOATINGLY MOUNTED COLUMN FRAME FOR WOBBLE COMPENSATION MOVEMENT

(71) Applicant: FIBRO GMBH, Hassmersheim (DE)

(72) Inventor: Georg Schreck, Hassmersheim (DE)

(73) Assignee: FIBRO GMBH, Hassmersheim (DE)

( * ) Notice: Subject to any disclaimer, the term of this patent is extended or adjusted under 35 U.S.C. 154(b) by 140 days.

(21) Appl. No.: 14/915,682

(22) PCT Filed: Apr. 17, 2015

(86) PCT No.: PCT/EP2015/058456
§ 371 (c)(1),
(2) Date: Mar. 1, 2016

(87) PCT Pub. No.: WO2015/162073
PCT Pub. Date: Oct. 29, 2015

(65) Prior Publication Data
US 2016/0199900 A1 Jul. 14, 2016

(30) Foreign Application Priority Data

Apr. 22, 2014 (DE) .................... 10 2014 105 644

(51) Int. Cl.
*B21D 37/12* (2006.01)
*B21D 37/18* (2006.01)
(Continued)

(52) U.S. Cl.
CPC ............. *B21D 37/12* (2013.01); *B21D 37/18* (2013.01); *B26D 7/0006* (2013.01); *B26F 1/40* (2013.01);
(Continued)

(58) Field of Classification Search
CPC ........ B21D 37/12; B21D 37/18; B26D 7/006; B26F 1/40; F16C 29/002; F16C 29/02; F16C 35/02; F16C 2322/14; B30B 15/041
(Continued)

(56) References Cited

U.S. PATENT DOCUMENTS

| 2,869,177 A * | 1/1959 | Jurgeleit ............... B30B 15/041 100/214 |
| 2016/0199900 A1* | 7/2016 | Schreck ............... F16C 29/002 72/456 |

FOREIGN PATENT DOCUMENTS

| CN | 201271705 Y | 7/2009 |
| DE | 1142148 A | 1/1963 |

(Continued)

OTHER PUBLICATIONS

International Search Report dated Jun. 30, 2015 issued in PCT/EP2015/058456.

*Primary Examiner* — David B Jones
(74) *Attorney, Agent, or Firm* — Scully Scott Murphy and Presser; Frank Digiglio

(57) ABSTRACT

The present invention relates to a column frame (20) for tools of stamping and forming technology, consisting of a head plate (1) and a base plate (2) between which guide columns (3) for guiding a guide plate (4) are arranged, and the guide columns (3) defining a movement direction Z for the guide plate (4), characterized in that the guide plate (4) is mounted elastically on the guide columns (3) on guide plate-side guide units (5) in such a way that the guide plate (4) can wobble about an axis parallel to the Z direction.

15 Claims, 3 Drawing Sheets

(51) Int. Cl.
　　　*B30B 15/04*　　　(2006.01)
　　　*B26D 7/00*　　　(2006.01)
　　　*B26F 1/40*　　　(2006.01)
　　　*F16C 29/00*　　　(2006.01)
　　　*F16C 29/02*　　　(2006.01)
　　　*F16C 35/02*　　　(2006.01)

(52) U.S. Cl.
　　　CPC .......... *B30B 15/041* (2013.01); *F16C 29/002* (2013.01); *F16C 29/02* (2013.01); *F16C 35/02* (2013.01); *F16C 2322/14* (2013.01)

(58) Field of Classification Search
　　　USPC .......................................................... 72/456
　　　See application file for complete search history.

(56) References Cited

FOREIGN PATENT DOCUMENTS

| | | |
|---|---|---|
| DE | 7306363 U | 7/1973 |
| DE | 2441000 A1 | 3/1976 |
| FR | 2335726 A1 | 7/1977 |

\* cited by examiner

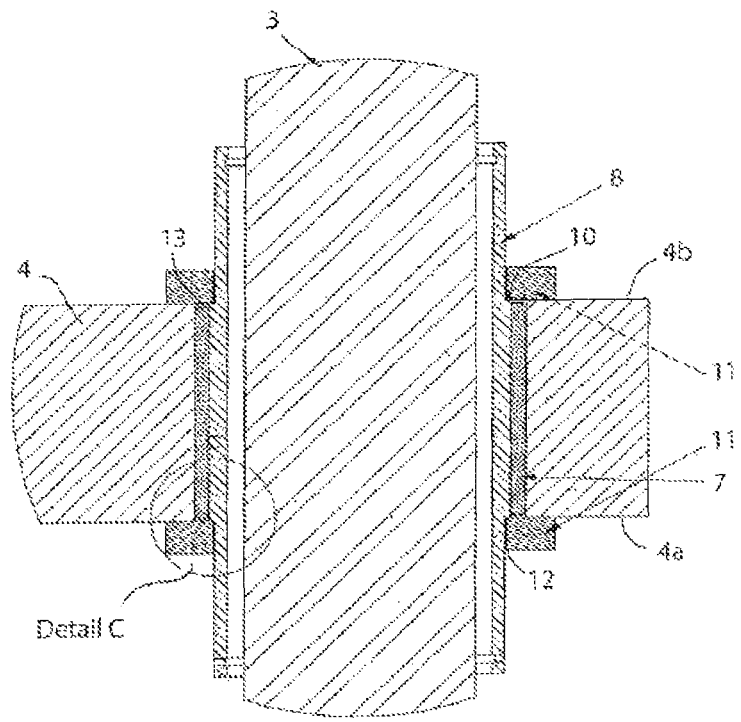
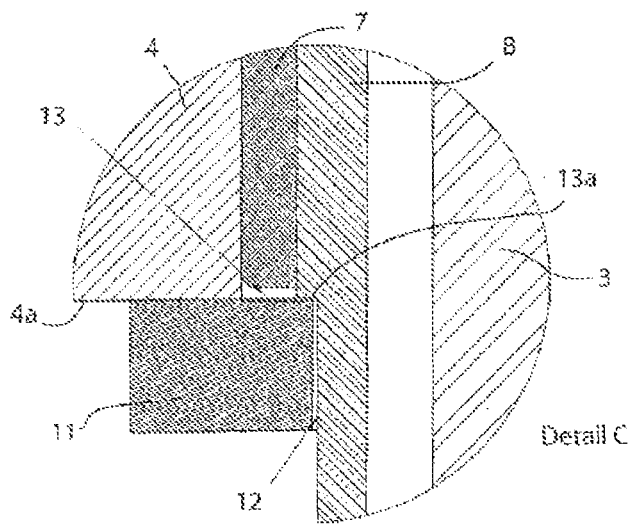
Fig. 4

FLOATINGLY MOUNTED COLUMN FRAME FOR WOBBLE COMPENSATION MOVEMENT

The invention relates to a column frame, preferably for tools of stamping and forming technology, consisting of a head plate, a base plate and the features of claim 1.

Column frames with different designs are known in the prior art. Column frames are typically manufactured from steel and aluminum. It is known that column frames of steel are annealed free of tension and ground or finely milled in a plane-parallel manner as a function of their size. Column guide frames are manufactured, for example, according to DIN or ISO and work standards from steel, cast iron or aluminum with sliding guidance or ball guidance. In addition, small presses, precision tool rigs and rapid-replacement tool frames are known which can be constructed in accordance with the principle of a column frame.

Column frames for tools of stamping- and forming technology typically consist of a head plate and a base plate between which guide columns for guiding a guide plate are arranged and the guide columns define a direction of movement Z for the guide plate. The guide plate is usually mounted at suitable supports of the guide columns in such a manner that it can be moved up and down. The guidance type can be on the one hand a sliding bearing (sliding guidance) and on the other hand a ball guidance.

However, there are many types of construction of the commercially known column frames. DE-OS 2441000 concerns, for example, a column frame in which the guide columns are connected to the stamp guidance plate by separate fastening means in a readily detachable manner and are resistant to traction and pressure.

DE 1142148 A shows another column frame in the prior art which relates to a device for lubricating the guide columns and guide sleeves of the column frame for a stamping tool. This device concerns a solution for the lubrication of guide columns and guide sleeves in which in the sleeves a floating back and forth movement of the column by the pressure and suction being produced in such an arrangement results in a uniform distribution of lubricant and an economical consumption of lubricant.

However, the precision of column frames and their quality depends on a plurality of factors. An important point consists in making available a suitable guidance for the guide plate. However, in column guide frames particular attention, in addition to the actual guiding, should also be directed to the working task associated with the column frame. Therefore, the design of the sliding guide sleeves must not only resist the high stroke numbers and the mechanical stresses that occur but also must have qualities suited for the particular application.

Thus, there are pressing methods in particular in the area of the processing of plastics and of sheets in which a local introduction of force into the guide plate takes place via a delimited, i.e., partial surface segment of the guide plate in such a manner and the guide plate strikes an elevation of material at first in such a manner that that as a result forces are introduced into the guide plate and consequently into the support in an uneven manner. Therefore, a clamping of the guide plate can also occur at times.

Furthermore, some products to be worked on are based on manufacturing tolerances such that they must be sustained when working with the column frame. This can also result in undesired effects as a consequence of the occurring forces. It is always disadvantageous if forces asymmetrically occur between the columns of the column frame, in particular if high stroke numbers are to be achieved with the column frame at the same time.

The invention therefore has the problem of overcoming the previously cited disadvantages and of making available an improved column frame in which the guide plate can suitably react to such mechanical and outside influences even in the case of a dynamic loading.

This problem is solved with a column frame with the features of claim 1.

The basic concept of the present invention is to mount the guide plate in a floating manner between the base plate and the head plate. This is achieved in accordance with the invention in that the guide units of the guide plate are mounted elastically and not rigidly, as a result of which a wobble compensation movement is made possible. As a result of the fact that the guide plate is preferably held and guided on the guide columns on all guide units with an elastic support, the guide plate can make a floating compensation movement upon the introduction of an off-center force. The degree or the extent of the floating movement is dependent, among other things, on the elasticity of the support and the support play, which is provided according to instructions. The composition movement due to the floating support can also be described as a wobbling movement about an axis parallel to the direction of the activation of the guide plate.

Accordingly, according to the invention a column frame for tools of stamping and forming technology is made available and consists of a heat plate and a base plate between which preferably four guide columns for guiding a guide plate are arranged and in which the guide columns define a direction of movement Z for the guide plate, wherein the guide plate is elastically supported on guide plate-side guide units on the guide columns in such a manner that that the guide plate can execute a wobbling movement about an axis parallel to the Z direction.

In a preferred embodiment of the invention the column frame comprises a guide unit for each guide column which unit is supported in a support opening of the guide plate on an elastic support sleeve. Cylindrical openings in the guide plate are advantageously introduced in at the corners of the plate and a guide unit is inserted into each one of them.

It is advantageously provided that the guide units comprise at least one elastic support sleeve constructed from an elastic material.

In an especially advantageous and favorable embodiment of the invention the elastic material is an elastic plastic material, an elastomer, a natural rubber or an elastically deformable rubber material. It is preferable if the entire support sleeve is formed from this material. However, in an alternative embodiment of the invention several different elastic and/or non-elastic materials can also be used in a composite. Therefore, for example, a cylindrical support can be constructed from a soft, inner elastic material and a harder elastic material surrounding this support ring. As a further alternative a metallic support ring can be arranged between them.

However, it is essential for the invention that the support as such is constructed as an elastically deformable support.

In another preferred embodiment of the invention the elastic material has a Shore hardness of 50 to 90, especially preferably a Shore hardness of 70 Shores. It was recognized according to the invention that by using a material with this Shore hardness the material property can be used in an especially good ratio of sufficient elasticity with sufficient hardness and support stability at the same time.

It is furthermore advantageous if the construction of the guide unit is carried out in such a manner that the guide unit comprises, in addition to the elastic support sleeve, a sliding guide or ball guide surrounding the guide column which can be moved up and down along the guide column.

It is furthermore advantageous if the support sleeve is fastened around the guide sleeve on it, preferably pressed and/or adhered onto the guide sleeve on its outer jacket.

In an especially advantageous embodiment of the invention each of the guide units comprises a guide sleeve with two support sections with a diameter D1 and comprises a fastening section with a widened outside diameter D2 between the support sections for fastening the support sleeve. In this manner a circumferential step or offset is formed at the transition between the support sections and the fastening section in the outer jacket of the guide sleeve. The support sleeve is advantageously fastened around this fastening section provided with a larger outside diameter.

The invention provides for fastening the guide units that they are movably held between an upper and a lower safety disk covering the support opening at least partially on the guide unit. In other words, this means that the guide unit with its elastic support attached to the outer jacket of the guide sleeve is held between the two safety disks and can move elastically in such a manner that a wobbling movement of the guide unit relative to the guide plate (and to the imaginary middle axis through the support opening of the guide plate) is possible.

It is furthermore advantageously provided that an axial slot is provided between the guide unit or its outer jacket and the particular safety disk whose slot width defines and limits an axial support play for a possible wobbling movement of the guide unit.

In another preferred embodiment of the invention a slot is provided according to the instructions between the particular safety disk and the elastic support sleeve whose slot width represents a longitudinal compensation for the support sleeve (upward and downward).

Other advantageous further developments of the invention are characterized in the subclaims and are shown in detail in the following together with the description of the preferred embodiment of the invention using the figures. In the figures:

FIG. 4 shows a sectional view with a detailed view of the sectional view through the guide units of the guide plate of the column frame according to FIG. 1.

Figure 1:
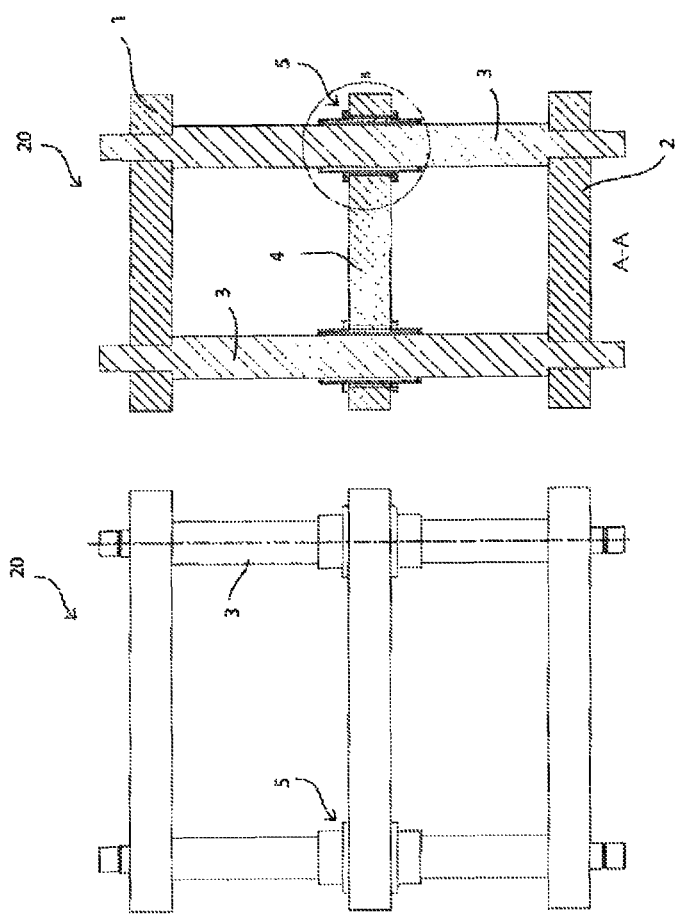
FIG. 1 shows a column frame according to an embodiment of the invention in a side view and a sectional view.

FIG. 1 shows a column frame 20 according to an exemplary embodiment of the invention in a side view and a sectional view. The column frame 20 consists of a head plate 1 and a base plate 2 between which four guide columns 3 are arranged for guiding a guide plate 4. The guide columns 3 define a direction of movement Z for the guide plate 4, wherein the guide plate 4 on guide plate-side guide units 5 (that are explained in detail later in the description for FIG. 5) is elastically mounted on the guide columns 3 in such a manner that the guide plate 4 can execute a wobbling movement about a (preferably central) axis parallel to the Z direction. That means that the planes of the guide plate 4 (and the guide plate 4 as such), which planes are set by the bottom side 4a and the upper side 4b, can execute a proper tilting and wobbling movement in a plane position outside of a parallel plane. The degree of the tilting angle is a function of the selection of various factors of the guide units 5 such as, e.g. modulus of elasticity, radial slot formation and axial slot formation, height of the units, etc.).

As can be seen from FIGS. 1 and 4, the four guide units 5 are supported in a support opening 6 of the guide plate 4 on an elastic support sleeve 7. The support openings 6 are introduced as cylindrical openings into corner sections of the guide plate 4.

The guide units 5 comprise an elastic support sleeve 7 formed from an elastic material which sleeve is necessary so that the guide plate 4 can execute the above-indicated wobbling movement and consequently a floating support is obtained. The elastic material is, for example, an elastic plastic material, an elastomer, a natural rubber or an elastically deformable rubber material. Suitable elastic materials are such materials that can be elastically compressed so that when executing a wobbling movement about a tilting angle α the elastic support sleeve 7 can be compressed in the direction of the wall thickness and can go back elastically by itself again into its original position. An elastic material is preferably used that has a Shore hardness of 50 to 90, especially preferably 70 Shores. Furthermore, it is preferable if the wall thickness of the elastic support sleeve 7 is approximately between 3% and 7% of the outside diameter of the support sleeve 7 and more preferably approximately 5% of the outside diameter. In an especially preferred embodiment of the invention the height of the support sleeve is between 60% and 80% of the outside diameter of the support sleeve 7 and more preferably approximately 65% of the outside diameter.

Figure 2:
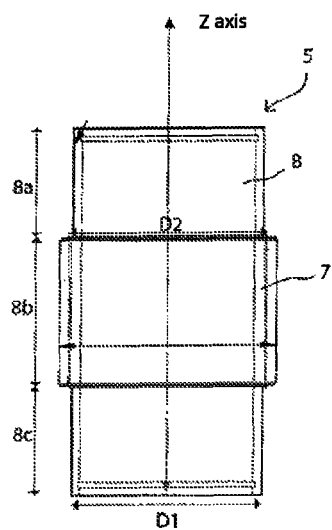
FIG. 2 shows an exemplary embodiment of a guide unit.

The guide units 5 comprise, in addition to the elastic support sleeve 7, a guide sleeve 8 surrounding the guide column 3. The support sleeves 7 are fastened around the guide sleeve 8 on its outer jacket, preferably pressed and/or adhered onto the guide sleeve 8 in order to obtain the guide unit according to FIG. 2.

Figure 3:
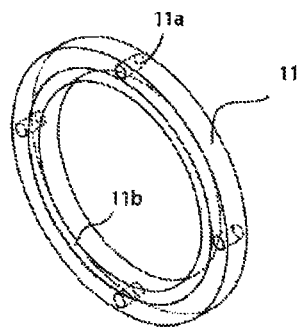
FIG. 3 shows an exemplary embodiment of a safety disk for the guide unit of FIG. 2.

The guide units are constructed in such a manner that the guide sleeves are constructed with two support sections 8a, 8c with a diameter D1 and with the fastening section 8b located between them with a greater, i.e., widened outside diameter D2 for fastening the support sleeve 7, as a result of which an (upper and lower) surrounding step 10 (see in this regard also FIG. 4) is obtained on the transition between the support sections 8a, 8c and the fastening section 8b. These steps serve as upper and lower limiting means, taking into consideration the tolerances and forming a slot in accordance with the instructions for the safety disk 11 (see tolerance slot 13a) shown in FIG. 3 which is constructed to this end with an annular offset 11b. The support of the guide units is apparent from FIG. 5. The support sleeve 7 is fastened around the fastening section 8b. The guide units 5 are movably held on the guide plate 4 between an upper and a lower safety disk 11 at least partially covering the support opening 6 and on the fastening openings 11 placed in the support disk 11. A radial annular slot 12 is provided between the outer jacket of the guide unit 5 and the particular side surface of the safety disk 11 facing the outer jacket. The slot width defines the support play for a possible wobbling movement of the guide unit 5.

It can furthermore be recognized that a slot 13 is normally provided between the particular safety disk 11 and the elastic support sleeve 7 in such a manner that a longitudinal compensation is made available for the support sleeve. The position of the upper and lower steps 10, which serve as limiting means for the safety disks 11 in the Z direction, is higher in height in a plane offset around the tolerance slot 13a like the particular upper and lower sides 4a, 4b of the guide plate 4. In the present exemplary embodiment the height of the fastening section 8b corresponds approximately to the thickness of the guide plate 4 in the area of the fastening sections for the safety disks 11. Since the safety disk has an offset 11b on the side facing the slot, a tolerance slot 13b results between the step 10 and the offset 11b.

The invention is not limited in its construction to the previously indicated preferred exemplary embodiments but rather a number of variants are conceivable that make use of the presented solution even in the case of embodiments that are basically differently designed.

The invention claimed is:

1. A column frame for tools of stamping and forming technology, comprising a head plate and a base plate between which guide columns are arranged to connect said head plate and said base plate for guiding a guide plate which is arranged to engage said guide columns such that the guide columns define a direction of movement Z for the guide plate wherein guide plate-side guide units are provided on the guide columns to elastically support said guide plate in such a manner that the guide plate can execute a wobbling movement about an axis parallel to the Z direction.

2. The column frame according to claim 1, wherein the guide units are supported in a support opening which is provided in the guide plate and wherein said opening is provided with an elastic support sleeve to support said guide units.

3. The column frame according to claim 1 wherein the guide units comprise at least one elastic support sleeve made of an elastic material.

4. The column frame according to claim 3, wherein the elastic material is an elastically compressible material.

5. The column frame according to claim 3, wherein the elastic material has a Shore hardness of 50 to 90.

6. The column frame according to claim 2, wherein each guide unit comprises, in addition to said elastic support sleeve, a guide sleeve surrounding the guide column.

7. The column frame according to claim 6, wherein the support sleeve is fastened around the guide sleeve on it.

8. The column frame according to claim 2, wherein the guide units comprise a guide sleeve with two support sections with a diameter D1 and a fastening section with a widened outside diameter D2 between them for fastening the support sleeve.

9. The column frame according to claim 8, wherein the support sleeve is fastened around the fastening section.

10. The column frame according to claim 8, wherein the guide units are movably held on the guide plate between an upper and a lower safety disk at least partially covering the support opening, said upper safety disk engaged at a top side of the guide plate and the lower safety disk engaged at a bottom side of the guide plate.

11. The column frame according to claim 10, wherein a radial annular slot is provided between the guide unit and at least one of the upper safety disk and the lower safety disk to permit wobbling movement of the guide unit.

12. The column frame according to claim 10, wherein a slot is provided between the at least one of the upper safety disk and the lower safety disk and the elastic support sleeve, wherein a slot width of said elastic support sleeve constitutes a longitudinal compensation for the support sleeve.

13. The column frame according to claim 4, wherein the elastically compressible material is an elastic plastic material, an elastomer, a natural rubber or an elastically compressible composite rubber material.

14. The column frame according to claim 3, wherein the elastic material has a Shore hardness of 70 Shores.

15. The column frame according to claim 7, wherein the support sleeve is pressed and/or adhered on the guide sleeve.

* * * * *